Dec. 9, 1930.  L. BALAZINSKI  1,784,775
AIRSHIP
Filed Oct. 3, 1929  3 Sheets-Sheet 1
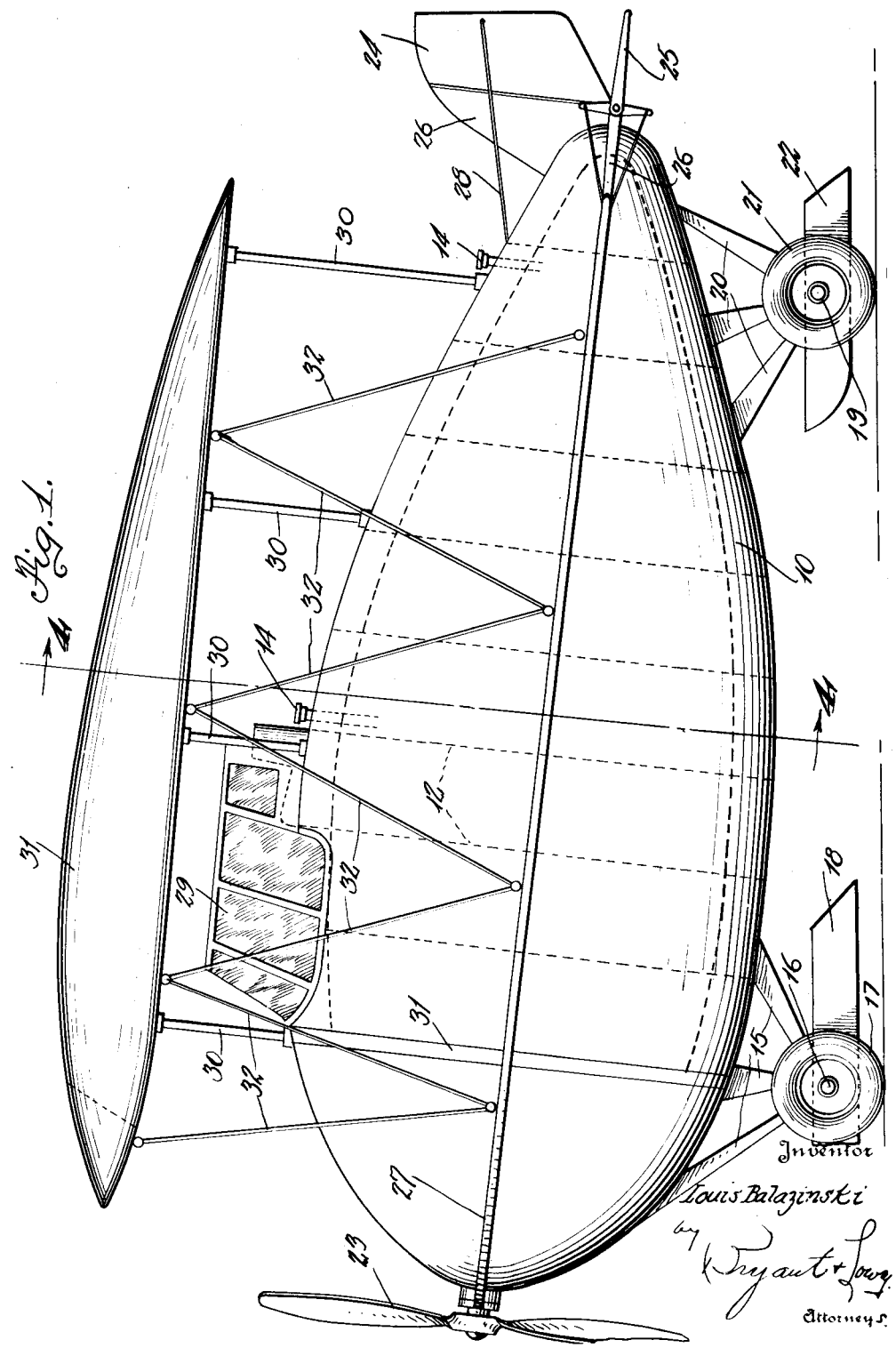

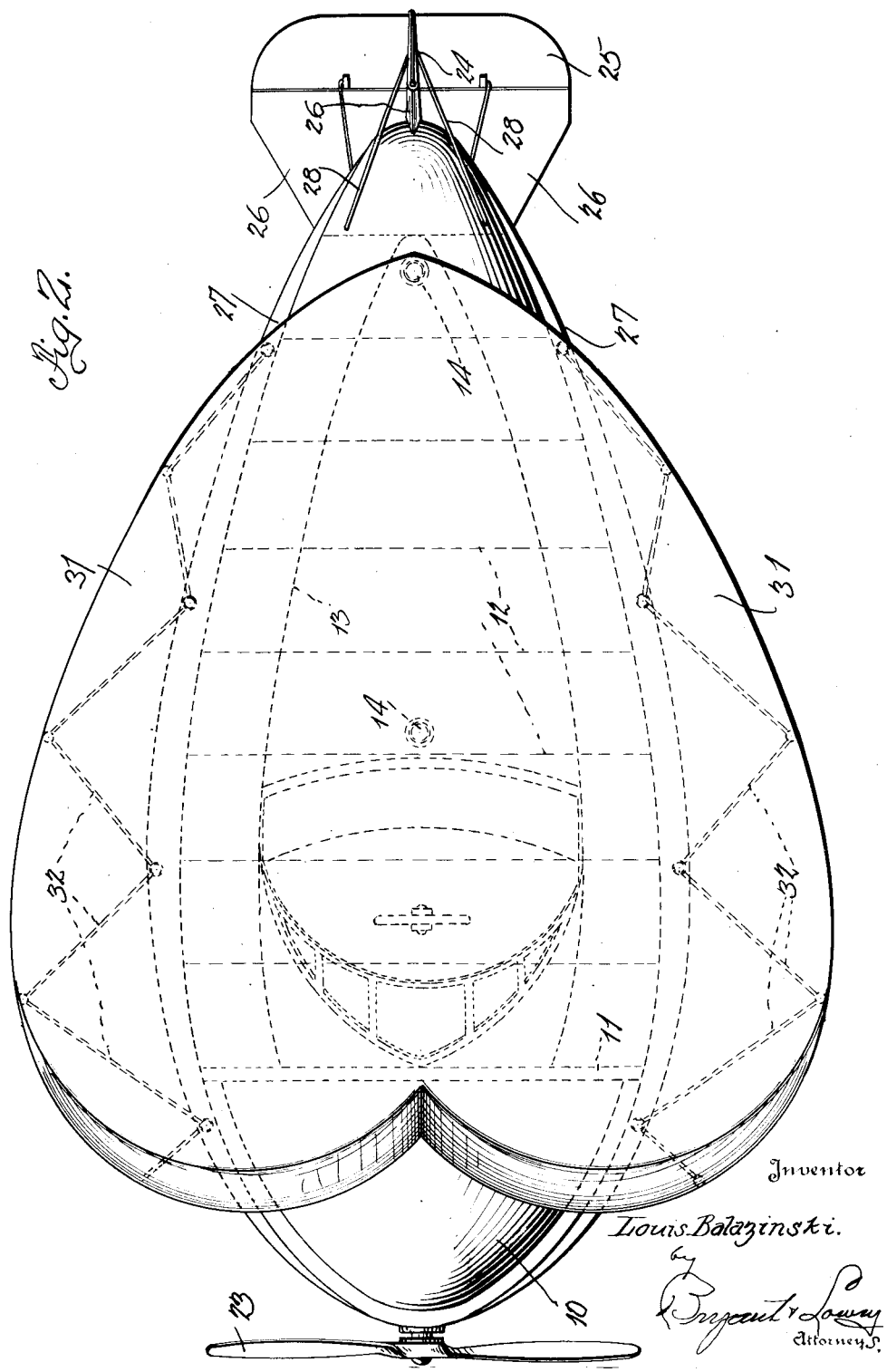

Dec. 9, 1930.　　　L. BALAZINSKI　　　1,784,775
AIRSHIP
Filed Oct. 3, 1929　　　3 Sheets-Sheet 3
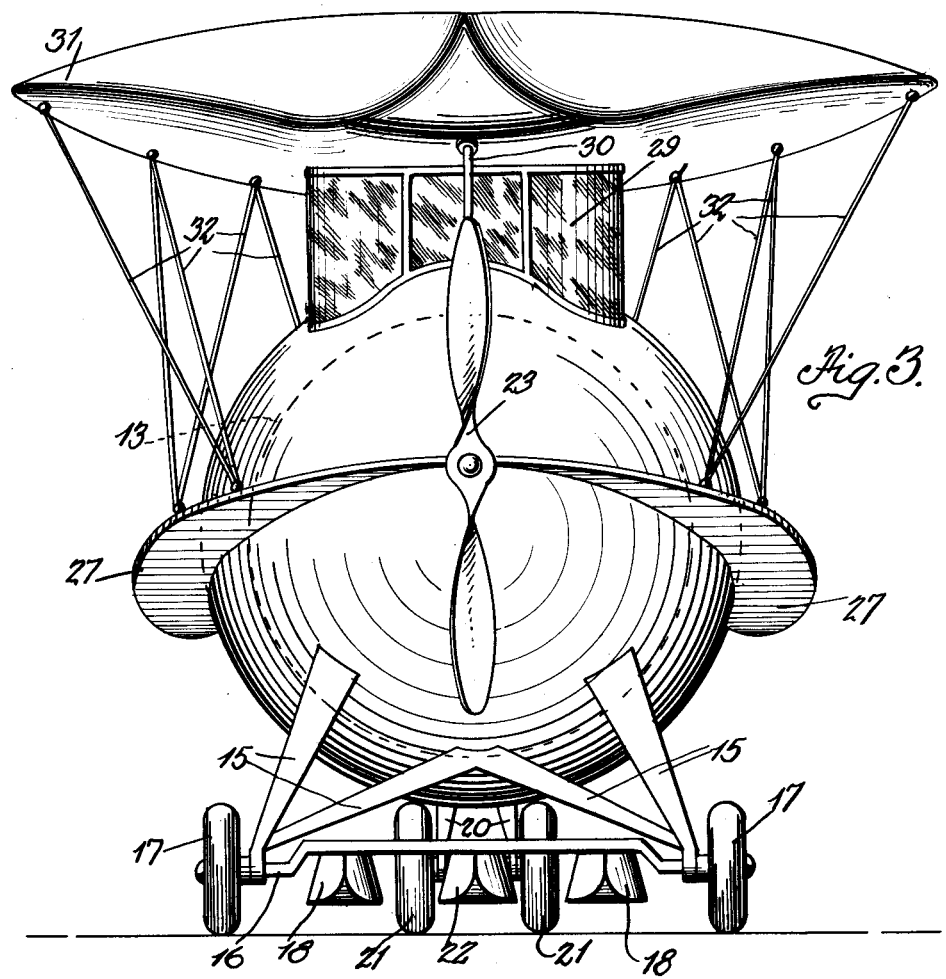
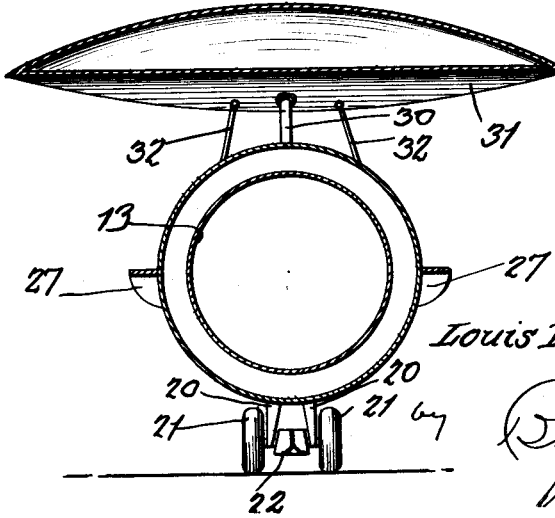

Patented Dec. 9, 1930

1,784,775

UNITED STATES PATENT OFFICE.

LOUIS BALAZINSKI, OF EAST PORT CHESTER, CONNECTICUT

AIRSHIP

Application filed October 3, 1929. Serial No. 397,050.

This invention relates to combined airplanes and balloons.

One object of the invention is to provide an improved general construction for devices of this character.

A second important object of the invention is to provide an improved construction of balloon for use in connection with combined balloons and airplanes wherein the balloon will have a platform or catwalk in the shape of a platform extending all around the equatorial plane of the balloon, this platform serving to carry all control rods and the like in accessible positions and also serving to aid the lateral rigidity of the balloon and as an aerofoil in flight to prevent pitching of the machine.

A third important object of the invention is to provide an improved construction of flying machine capable of landing on water or land as well as flying in air.

A fourth important object of the invention is to provide a novel form of combined airplane and balloon wherein the device has wings containing a flotation gas and which are so arranged as to take up little more space laterally than the balloon portion of the apparatus.

With the above and other objects in view, as will be presently understood, the invention consists in general of certain novel details of arrangements and combinations of parts hereinafter fully described, illustrated in the accompanying drawings, and specifically claimed.

In the accompanying drawings like characters of reference indicate like parts in the several views, and:—

Figure 1 is a side elevation of the improved airship;

Figure 2 is a plan view thereof;

Figure 3 is a front view thereof; and

Figure 4 is a section on the line 4—4 of Figure 1.

In the embodiment of the invention here illustrated, the fuselage 10 is of elongated egg shape with its larger end forward so as to produce a stream line structure. This body is preferably constructed of some light metal such as aluminum or the like and is provided, adjacent its forward end with a suitable partition 11, dividing the body into a forwardly located engine space and an aft gas and storage space. Annular ribs 12 extend around the body at right angles to its axis and on the inner edges of these ribs is supported a tank 13 for hydrogen or other light flotation gas. The spaces between the shell of the fuselage and this tank or gas field are used for storage of oil, water, gasoline or other fuel and may, of course, be also arranged so that some of these spaces may be used to stow mail, baggage and the like. The gas tank is provided with suitable filling nozzles or pipes 14. With this construction the annular ribs or partitions serve to strengthen the entire structure and render it rigid as well as to separate the space between the gas tank and shell into suitable storage spaces.

Supported by suitable struts or braces 15 is a front axle 16 on the outer ends of which are mounted the pneumatic tired ground wheels 17. Secured beneath this axle, adjacent its outer ends, is a pair of pontoons or floats 18.

At the rear there is a short rear axle 19 supported by struts or braces 20. On the ends of this axle are ground wheels 21 and centrally between these ground wheels is a pontoon or float 22. Thus, the machine can be used on land or on water as may be desired.

At the forward end of the fuselage or body 10 is the usual propeller 23 and at the rear or aft end is an empennage having the lateral direction rudder 24 and the vertical direction rudder 25 as well as the stabilizer fins 26. Extending forwardly from this empennage around the bow of the ship is a platform or fin 27 located substantially in the equatorial plane of the body 10 and this platform serves to give additional lateral rigidity to the ship, to provide a support for the control wires or rods 28 and to form a catwalk so that access may be had to these and other parts. Also this platform acts as a stabilizing fin against pitching of the machine in flight.

In the top of the body 10 and projecting thereabove is the control or pilot's cabin 29 containing all of the usual controls and instruments for navigation, these being deemed unnecessary to be here illustrated as they may be of any of the forms commonly in use.

Projecting up from the body 10 are vertical struts 30 which support a heart-shaped hollow wing structure 31 of double convex form in longitudinal section so as to be properly stream lined. Braces 32 connect the lateral edge portions of this wing structure with the platform 27 and thus hold it in proper position with its longitudinal axis inclined upwardly away from the axis of the body at its forward end. This wing structure is filled with hydrogen or other light gas so that it provides static lift as well as dynamic lift in motion.

Obviously, with an air ship constructed in this manner, the wing spread can be much less than in a ship in which all the lift is obtained dynamically, by movement through the air. For this reason, as well as due to the peculiar shape of the wing structure, the breadth of the wings need be but little, if any, more than the breadth of the wing or fuselage. Thus, the ground area necessary for such an airship will be less in width than that necessary for an ordinary airplane of like capacity. Also, the lift due to the gas in the tank and wing structure will enable the ship to rise with less run and to land at a low speed without danger.

There has thus been provided a simple and efficient construction of air ship of the kind described and for the purpose set forth.

It is obvious that many changes may be made in the form, size, proportions and construction of the invention without departing from its spirit. I do not therefore desire to confine the invention to the exact construction, arrangement or proportions here shown but I wish to include all such as properly come within the scope claimed.

Having thus described the invention, what is claimed as new is:—

1. In an air ship, an ovate hollow body, an exterior platform on the equatorial zone of said body constituting stiffening means against lateral deformation, annular rings extending around the inner surface of the body wall at right angles to the longitudinal axis of the body, and a gas tank supported by the inner edge portions of said rings to hold flotation gas, said rings dividing the space between the body wall and gas tank into storage compartments.

2. In an air ship, a body of ovate form having its large end forward, a platform extending around the bow of said body and along the sides thereof in the equatorial plane of the body and constituting a stabilizing fin and catwalk, struts extending up from said body, a wing structure supported on said struts, and braces extending between the lateral edges of the wing structure and the platform.

3. In an air ship, a body of ovate form having its large end forward, a platform extending around the bow of said body and along the sides thereof in the equatorial plane of the body and constituting a stabilizing fin and catwalk, a propeller at the forward end of said body, an empennage at the rear end thereof, control rods for said empennage, struts extending up from said body, a wing structure supported on said struts, and braces extending between the lateral edges of the wing structure and the platform.

4. In an air ship, an ovate hollow body, an exterior platform on the equatorial zone of said body constituting stiffening means against lateral deformation, annular rings extending around the inner surface of the body wall at right angles to the longitudinal axis of the body, struts extending up from said body, a wing structure supported on said struts, and braces extending between the lateral edges of the wing structure and the platform.

5. In an air ship, an ovate hollow body, an exterior platform on the equatorial zone of said body constituting stiffening means against lateral deformation, annular rings extending around the inner surface of the body wall at right angles to the longitudinal axis of the body, a gas tank supported by the inner edge portions of said rings to hold flotation gas, said rings dividing the space between the body wall and gas tank into storage compartments, struts extending up from said body, a wing structure supported on said struts, and braces extending between the lateral edges of the wing structure and the platform.

6. In an airship, an ovate hollow body, an exterior platform on the equatorial zone of said body constituting stiffening means against lateral deformation, annular rings extending around the inner surface of the body wall at right angles to the longitudinal axis of the body, a gas tank supported by the inner edge portions of said rings to hold flotation gas, said rings dividing the space between the body wall and gas tank into storage compartments, struts extending up from said body, a wing structure supported on said struts, and braces extending between the lateral edges of the wing structure and the platform, said wing structure being hollow and filled with flotation gas.

7. In an air ship, an ovate hollow body, an exterior platform on the equatorial zone of said body constituting stiffening means against lateral deformation, annular rings extending around the inner surface of the body wall at right angles to the longitudinal axis of the body, a gas tank supported by the inner edge portions of said rings to hold flotation gas, said rings dividing the space between the body wall and gas tank into storage compartments, struts extending up from said body, a wing structure supported on said struts, braces extending between the lateral edges of the wing structure and the platform, said wing structure being hollow and filled with flotation gas, and being heart-shaped in plan and double convex in longitudinal section.

8. In an air ship, an ovate hollow body, an exterior platform on the equatorial zone of said body constituting stiffening means against lateral deformation, annular rings extending around the inner surface of the body wall at right angles to the longitudinal axis of the body, a gas tank supported by the inner edge portions of said rings to hold flotation gas, said rings dividing the space between the body wall and gas tank into storage compartments, struts extending up from said body, a wing structure supported on said struts, and braces extending between the lateral edges of the wing structure and the platform, said wing structure being hollow and filled with flotation gas, the longitudinal axis being inclined upwardly and forwardly away from the axis of said body.

9. In an air ship, an ovate hollow body, an exterior platform on the equatorial zone of said body constituting stiffening means against lateral deformation, annular rings extending around the inner surface of the body wall at right angles to the longitudinal axis of the body, a gas tank supported by the inner edge portions of said rings to hold flotation gas, said rings dividing the space between the body wall and gas tank into storage compartments, struts extending up from said body, a wing structure supported on said struts, braces extending between the lateral edges of the wing structure and the platform, said wing structure being hollow and filled with flotation gas, and being heart-shaped in plan and double convex in longitudinal section, the longitudinal axis being inclined upwardly and forwardly away from the axis of said body.

In testimony whereof I affix my signature.

LOUIS BALAZINSKI.